COULT & ROACH.
Treating Quicksilver.
No. 56,378.  Patented July 17, 1866.
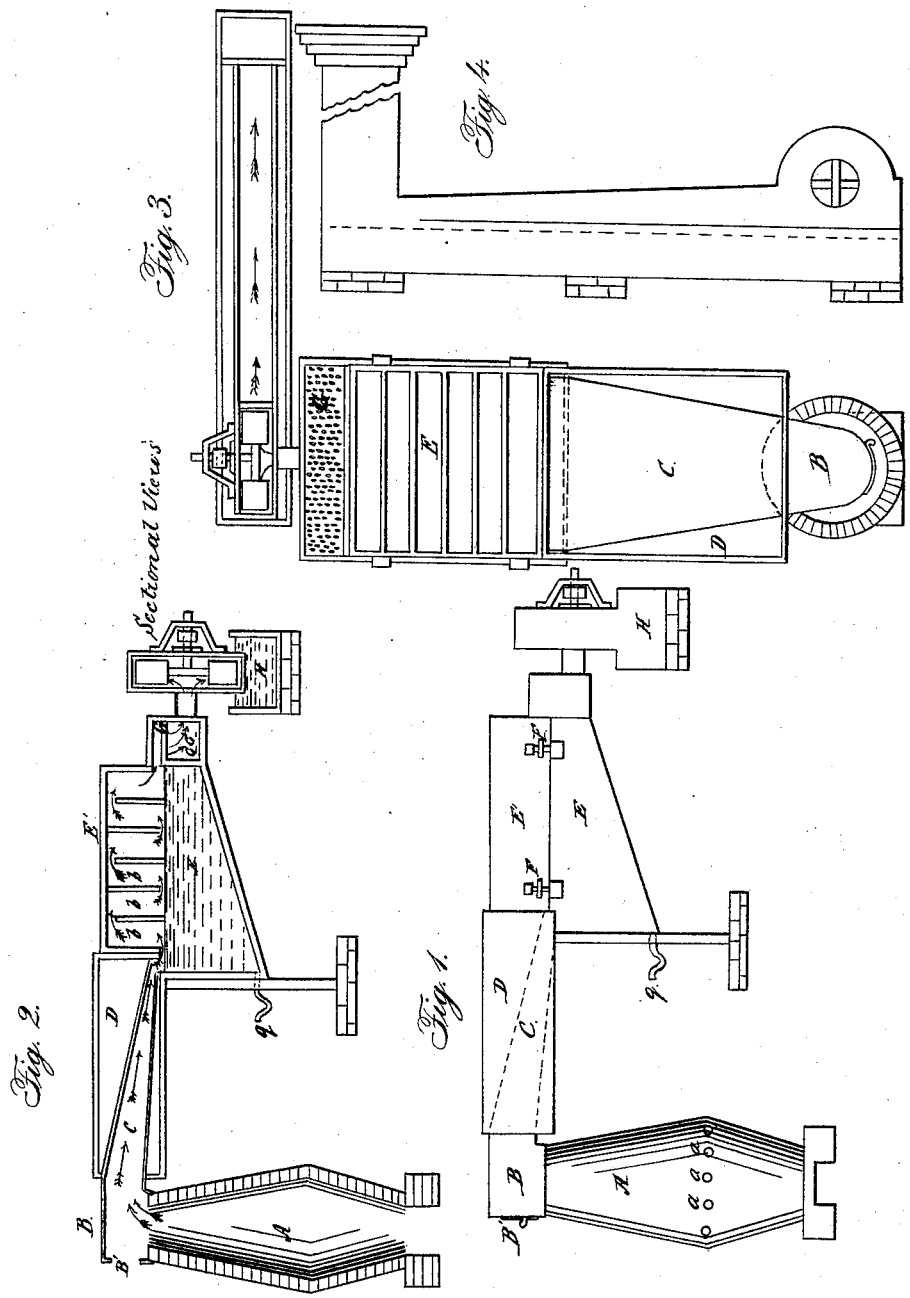
Witnesses:
Inventor:

UNITED STATES PATENT OFFICE.

J. C. COULT AND J. ROACH, OF SAN FRANCISCO, CALIFORNIA.

IMPROVED APPARATUS FOR TREATING ORES.

Specification forming part of Letters Patent No. 56,378, dated July 17, 1866.

*To all whom it may concern:*

Be it known that we, JOSEPH C. COULT and JOHN ROACH, of the city and county of San Francisco, State of California, have invented certain new and useful Improvements on Coult & Roach's Concentrator and Condenser, for concentrating and condensing all volatile metals and other substances taken from natural formation; and we hereby declare that the following description and accompanying drawings are sufficient to enable any person skilled in the art or science to which it most nearly appertains to make and use the said invention or improvement without further invention or experiment.

The nature of our invention is explained by referring to the drawings.

Figure 1 represents a side elevation of an apparatus. Fig. 2 represents a sectional elevation. Fig. 3 represents a plan or top view with cover removed. Fig. 4 represents a side elevation of fan, conducting box or pipe, and chimney.

A represents a suitable furnace, with draft-holes $a\ a\ a$ at its greatest circumference, with a place at the base for withdrawing the refuse or débris. The hood B is placed on the top of the furnace, which is fed through the door B'. Joined to the hood is a flue or pipe, C, which may be luted, and can be applied to any other furnace. The area of the flue C is equal throughout, and enters the condenser in a form exposing the greatest condensing-surface while passing through the water-tank D, and it also presents an equal surface in coming in contact with the water in condenser E. The condensing-tank E is nearly filled with water. The bottom is made sloping, to allow the material to collect at the lowest point, and, if mercury, to run out in a pure state through the bent pipe into a receiver below.

Resting upon the water-tank just described is placed an inverted tank, E', which is divided into compartments by partitions $b\ b\ b$, crossing the water-tank below. A portion of these partitions are continued up, making a close joint at the top. The other portions are of the same width as those just described, and also extend across the inverted tank, but do not reach to the top, thus leaving space for the passage of the fumes through each alternate apartment.

This tank, being smaller than the one containing the water, is raised and lowered the same as a gasometer, by screws F F, to a desired depth, so as to allow the fumes to pass under the partitions, which are tight at the top and rest upon the surface of the water below. The under side of the pipe C on entering the tank is bent down, resting in the water, to prevent leakage. The upper side is also bent, and extends parallel with the lower edge of the end of the inverted tank, leading the fumes into the compartment before mentioned.

The fumes having passed through the condensers are now received in a small outside apartment just above the level of the water. The bottom of this chamber is a perforated diaphragm, G, to produce an equal distribution of the vapors above, which are concentrated again in the chamber below, over water, G', and pass into the fan or pump, which has also a water-bottom, H, and over which they pass into the chimney, as is shown at Figs. 2, 3, and 4.

All the water-tanks are provided with supply-pipes to keep them cool and waste-pipes to carry off the surplus water.

Operation: The furnace is filled with any kind of débris to within a few inches of the draft-holes $a\ a\ a\ a$, and upon this the fire is made, which is kept fed through the door above with fuel and ore in alternate layers. After the ore has yielded all its volatile contents the débris is drawn below and the charge settles down in proportion as drawn out. While the drawing and settling is going on, fuel and ore are being added through the door B, as before stated. The fumes, being now controlled by the machinery, are drawn into and through the pipe C in the cooling-tank D, and through the condensers E and E', coming first in contact with the water at the end of pipe C, then passing alternately over and under the partitions designated by the arrows, thereby retaining their heavier particles by their frequent contact with the water, and allowing the lighter particles to pass into the small outer chamber and down through the perforated bottom, to be concentrated in the lower chamber, having water on the bottom, thence out into the fan or pump, over a water-bottom, into a chimney.

If cinnabar ore be treated the mercury falls on the slanting bottom of tank E and runs out at the bent pipe *g*.

Having described our invention, so as to enable others skilled in the art to make and use the same without further invention or experiment, we will now proceed to state what we claim, and desire to secure by Letters Patent, to wit:

1. The pipe C, connecting with a furnace, and having a wide opening entering the condenser E, thereby imparting a greater distribution of the fumes as they enter said condenser or water-tank and equally spreading the fumes over the water, substantially as described. and for the purposes set forth.

2. The tank E, with an inclined bottom, and the partitions *b b b* in the inverted tank or cover of the same, and the adjusting-screws F F, attached thereto, substantially as described, and for the purposes set forth.

3. The perforated diaphragm G, having sufficient openings to equal the opening of pipe C where it enters the condenser E, as before stated, likewise the water-bottom G and G', over which the fumes collect and are drawn into a fan or pump, also giving a water-bottom, H, to the fan or pump, thereby bringing the fumes again in contact with the water for a long distance, and extracting all that it may be desirable to collect before allowing an escape into the chimney, substantially as described, and for the purposes set forth.

In witness whereof we have hereunto set our hands and seals this 28th day of May, 1866.

JOSEPH C. COULT. [L. S.]
JOHN ROACH. [L. S.]

Witnesses:
PHILIP A. ROACH,
C. W. M. SMITH.